United States Patent [19]
Knobloch

[11] Patent Number: 4,789,047
[45] Date of Patent: Dec. 6, 1988

[54] MOTOR VEHICLE SERVICING SYSTEM

[76] Inventor: Peter C. Knobloch, 4613 E. Euclid Ave., Phoenix, Ariz. 85044

[21] Appl. No.: 76,331

[22] Filed: Jul. 22, 1987

[51] Int. Cl.$^4$ ................................................. F16N 7/00
[52] U.S. Cl. ...................................... 184/1.5; 52/174; 137/234.6
[58] Field of Search ..................... 184/1.5; 137/234.6; 52/174, 169.7

[56] References Cited

U.S. PATENT DOCUMENTS

| | | | |
|---|---|---|---|
| 2,552,749 | 5/1951 | Tabet | 184/1.5 |
| 2,872,709 | 2/1959 | Brem | 137/234.6 |
| 3,451,261 | 6/1969 | Olsen | 52/174 X |
| 3,938,621 | 2/1976 | Bobbitt, Jr. | 184/1.5 |
| 4,188,985 | 2/1980 | Osterman | 184/1.5 X |
| 4,284,173 | 8/1981 | Patterson | 184/1.5 |
| 4,352,322 | 10/1982 | Brauer | 184/1.5 X |

*Primary Examiner*—Leonard E. Smith
*Attorney, Agent, or Firm*—Nissle & Leeds

[57] ABSTRACT

A vehicle lubrication system. The system includes a building structure with a motor vehicle servicing bay having a ground floor. An elongate trench formed in the ground floor includes a lower floor. The trench is sized to permit a vehicle to be positioned on the ground floor with the wheels of the vehicle straddling the trench. The depth of the trench from the ground floor to the lower floor is in the range of fourteen to twenty-eight inches. A creeper and oil splash pan are movably positioned in the trench. Apparatus is provided for removing oil through the dipstick tube of the vehicle.

9 Claims, 2 Drawing Sheets

MOTOR VEHICLE SERVICING SYSTEM

This invention relates to motor vehicle servicing systems.

More particularly, the invention relates to a motor vehicle servicing system which is readily installed in geographically unstable areas such as regions with high water tables, rocky ground, or with a high likelihood of earthquake occurrence; which substantially reduces the time required by conventional lubrication systems to change the oil and filter in a vehicle; which is readily retrofitted into the floor and building of an existing building; which provides a secure seal against seepage of oil into the soil and groundwater of an area and consequently readily meets local zoning and safety ordinances; which very substantially reduces the contacts with hot motor oil by an attendant and, consequently, reduces concerns by the Environmental Protection Agency regarding skin cancer resulting from such contact; which markedly reduces liability insurance costs associated with the risk of vapor contamination, fire, falls, and other injury associated with conventional pit type vehicle lubrication systems; which facilitates the use of aboveground oil storage tanks to eliminate the stringent and expensive monitoring procedures required with belowground storage tanks; which enables an oil splash pan to be readily positioned at any location beneath a vehicle to receive crankcase oil; which enables customers to safely view the oil change and lubrication of their vehicle; and, which can be installed at a cost substantially less than the well known, standard, "pit" vehicle lubrication system.

There are, in the United States, a variety of franchise operations which change the oil and lubricate a vehicle in a short period of time. Such "quick change" operations ordinarily utilize a system in which a pit is formed in the floor of a servicing building. The pit is deep enough to enable a serviceperson to stand upright in the pit and reach the undercarriage of a vehicle driven over and straddling the pit. The serviceperson changes the oil by removing an oil drain plug and letting the hot crankcase oil drain into an oil splash pan positioned in the pit beneath the car. While such pit systems are apparently widely accepted as the best method for operating a "quick change" vehicle lubrication service, the systems have many drawbacks, summarized in the following paragraph.

It is becoming increasing difficult to obtain construction permits for pit systems because of the ability of oil and other vehicle fluids to seep through concrete and contaminate ground water. It is especially difficult to obtain construction permits in geographically unstable regions such as regions with high water tables, rocky or sandy ground, or high earthquake potential. In pit systems the potential for oil spills is high because oil splash pans in the pit can only be positioned under a limited area of the undercarriage of a vehicle, and when the splash pan cannot be directly positioned beneath the oil drain plug or filter, the serviceperson (mechanic, etc.) typically utilizes a piece of cardboard to serve as a trough for carrying the oil from the crankcase drain or filter to the splash pan. As a result, hot oil invariably splashes on the face, hands or arms of the serviceperson. Since oil is a toxic substance, this increases the risk the serviceperson will develop skin cancer. Constructing a pit system is expensive because the depth of the pit and amount of concrete needed to line the pit are substantial. Further, the size of the pit makes it economically impracticable to seal floor and walls to insure that oil will not soak through the concrete into the surrounding earth or that ground water will not soak through the concrete into the pit. The depth of the pit makes it awkward to carry oil up to the top of pit, so waste oil collected from the crankcase of a vehicle is typically stored in an underground storage vessel, in the manner illustrated in U.S. Pat. No. 4,284,173 to Patterson. See reference character 37 in FIG. 3 of the Patterson patent. Ventilation of pit systems is difficult. Oil vapors tend to accumulate in the bottom of the pit and adversely affect the respiratory system of a serviceperson working in the pit. Since a serviceperson standing in the pit constantly cranes his neck to view the undercarriage of the vehicle, neck injuries appear to be a common complaint among servicepersons. The depth of the pits makes them a definite danger to servicepersons or children who accidently slip on oil and fall into the pits. Flash fires can result from oil residue or concentrated oil vapors in the pit. The cost of liability insurance for pit systems is, accordingly, high. Pit systems, while enabling a serviceperson to gain access to the undercarriage of a vehicle, waste substantial amounts of time when servicepersons walk up and down the stairs of the pit. This is why pit service systems typically utilize at least two servicepeople, one in the pit and one on the floor above the pit.

Despite the many drawbacks of the pit vehicle lubrication system, a strong consumer demand for "quick change" systems has helped foster the use of such systems.

Accordingly, it would be highly desirable to provide an improved vehicle lubrication system which would permit the oil and other fluids in a vehicle to be rapidly changed, which would, in comparison to the conventional pit system, be safer, less expensive in construction, significantly reduce the man hours required to operate the system, reduce insurance costs, reduce the problem of obtaining construction permits, and simplify handling of oil and other toxic waste fluid removed from a motor vehicle.

Therefore, it is a principal object of the invention to provide an improved motor vehicle lubrication system.

Another object of the invention is to provide an improved motor vehicle lubrication system which can be readily constructed in areas with geographical faults such as high water tables, rocky or sandy grounds, and high potential for earthquakes.

A further object of the invention is to provide an improved motor vehicle lubrication system which, in operation, requires significantly fewer man hours than conventional pit vehicle lubrication systems.

Still another object of the invention is to provide an improved motor vehicle lubrication system which minimizes or eliminates the contact of hot motor oil with the hands, arms, face and eyes of a serviceperson.

Yet a further object of the instant invention is to provide an improved motor vehicle lubrication system which greatly reduces or eliminates the likelihood oil vapors can settle and concentrate in concentrations and amounts harmful to a vehicle serviceperson.

Yet still another object of the invention is to provide an improved motor vehicle lubrication system which minimizes the likelihood of injury to servicepersons and consumers and minimizes the likelihood that oil and other toxic vehicle fluids will seep into surrounding soil and ground water.

These and other, further and more specific objects and advantages of the invention will be apparent to those skilled in the art from the following detailed description thereof, taken in conjunction with the drawings, in which.

Figure 1:
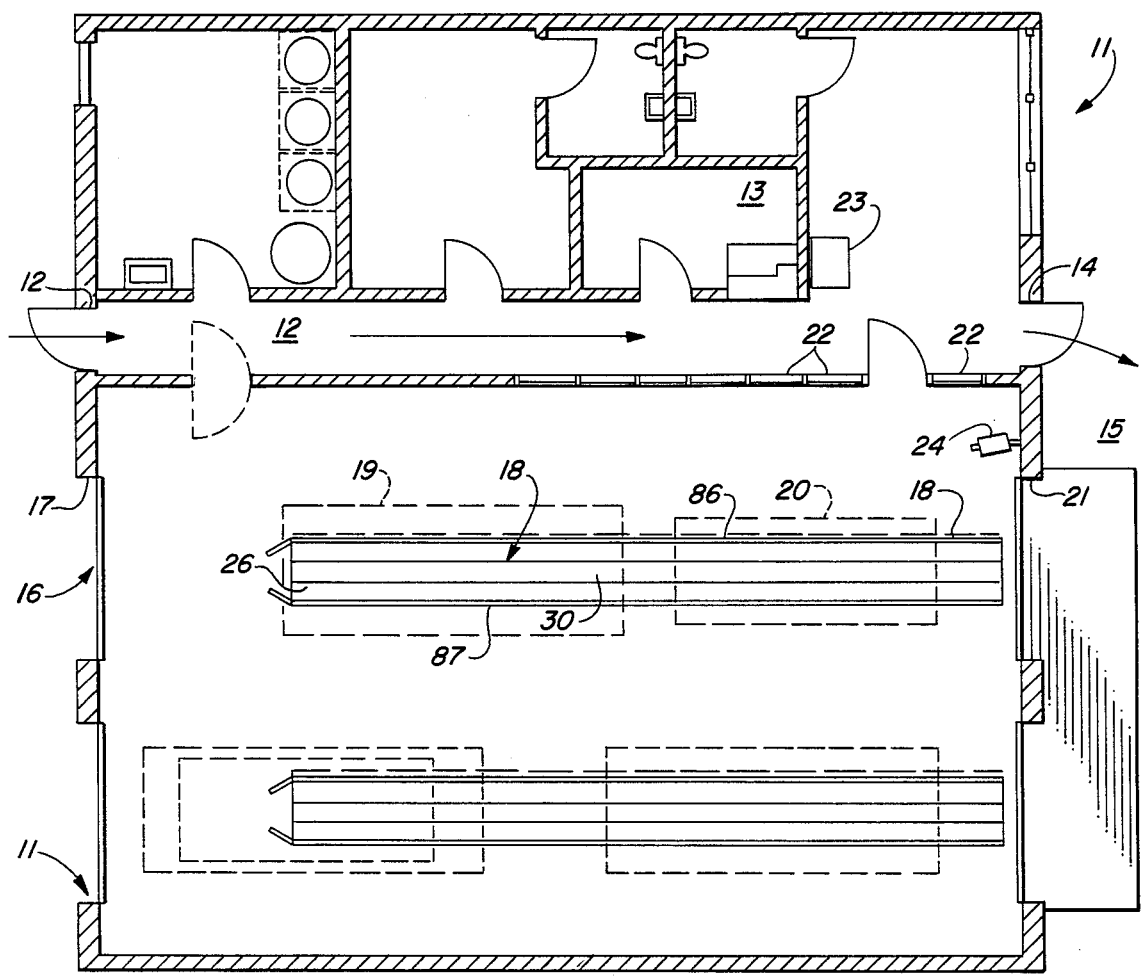
FIG. 1 is the floor plan of a building constructed in accordance with the principles of the invention.

Briefly, in accordance with my invention, I provide an improved vehicle lubrication system including a building structure; a motor vehicle bay in said structure including a ground floor; an elongate trench formed in said floor and having an opposed pair of parallel spaced vertical side walls and a lower floor, the side walls being spaced a distance less than the spacing distance between corresponding wheels of the vehicle, whereby the vehicle can be positioned in straddling relation above the trench, the trench having a depth in the range of fourteen to twenty-eight inches; a creeper for supporting a mechanic in a reclining position beneath the vehicle straddling the trench, the creeper including ground engaging wheels for moving the creeper over the trench floor; an oil splash plan positioned in the trench for movement therealong beneath the vehicle; and, oil removal means including an elongate wand positioned above the ground floor and shaped and dimensioned to be inserted by a mechanic standing on the ground floor through the oil dipstick tube of the vehicle into the oil sump of the vehicle, and suction means for drawing oil upwardly through the wand and out of the oil sump into an oil reservoir.

In another preferred embodiment of my invention I provide an improved vehicle lubrication system including a building structure; a motor vehicle servicing bay in the structure including a floor; an elongate trench formed in the floor and having an opposed pair of parallel spaced vertical side walls and a lower floor, the side walls being spaced a distance less than the spacing distance between corresponding wheels of the vehicle, whereby the vehicle can be positioned in straddling relation above the trench; an entrance in the building structure for driving a customer's vehicle forwardly over the trench into straddling relation thereof; an exit in the building structure for driving the vehicle forwardly from straddling relation with the trench to a position away from the trench in a claim area, the customer reclaiming the vehicle in the claim area; an entryway in the building structure leading to a cashier area in the structure, the customer walking along the entryway to the cashier area in a direction of travel generally corresponding to the forward direction of the vehicle over the trench; and a creeper on the lower floor for supporting a mechanic in a reclining position beneath the vehicle straddling the trench, the creeper including ground engaging wheels for moving the creeper over the floor of the trench. A television camera can be positioned in the trench to view a mechanic servicing the undercarriage of a vehicle straddling the trench. A television screen can be displayed in the building structure and be operatively associated with the camera to display to a customer a mechanic working in the trench on the customer's vehicle. A window area intermediate at least one of the entryway, cashier's area, and exitway can permit a customer to view the service bay and his car positioned therein.

In still another embodiment of my invention, I provide an improved vehicle lubrication system including a service bay having a ground floor; an elongate trench formed in the ground floor and having a lower floor and an opposed pair of parallel spaced vertical side walls, the side walls being spaced a distance less than the spacing distance between corresponding wheels of the vehicle, whereby the vehicle can be positioned in straddling relation above the trench, the trench having a depth in the range of fourteen to twenty-eight inches; a creeper for supporting a mechanic in a reclining position beneath the vehicle straddling the trench, the creeper including ground engaging wheels for moving the creeper over the floor of the trench; an oil splash pan positioned in the trench for movement therealong beneath the vehicle; and, means including a wand positioned above the ground floor and shaped and dimensioned to be inserted by a mecahnic standing on the ground floor through the oil dipstick tube of the vehicle into the oil sump thereof, the means including suctions means for drawing oil upwardly through the wand out of the oil sump into an oil reservoir.

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 to 5 illustrate a vehicle lubrication system constructed in accordance with the principles of the invention. The vehicle lubrication system illustrated in FIG. 1 includes building structure 11 having entryway 12, cashier area 13, exitway 14, and claim area 15. Vehicles are received from customers in receiving area 16 and driven forwardly through entrance 17 to a position with the front pair and rear pair of tiers straddling trench 18. Dashed lines 19 and 20 represent vehicles positioned over and straddling trench 18. After a vehicle 19, 20 has been lubricated or otherwise serviced, it is driven forwardly through exit 21 to claim area 15. After a customer delivers his vehicle to a serviceperson in receiving area 16 or drives the vehicle through entrance 17 to a position over trench 18, the customer exits his car and walks through entryway 12 to the cashier area 13. After or before paying the cashier, the customer can view television screen 23. Screen 23 receives signal(s) from camera 24 and/or camera 25. The customer walks through exitway 14 to reclaim his vehicle in claim area 15.

Figure 2:
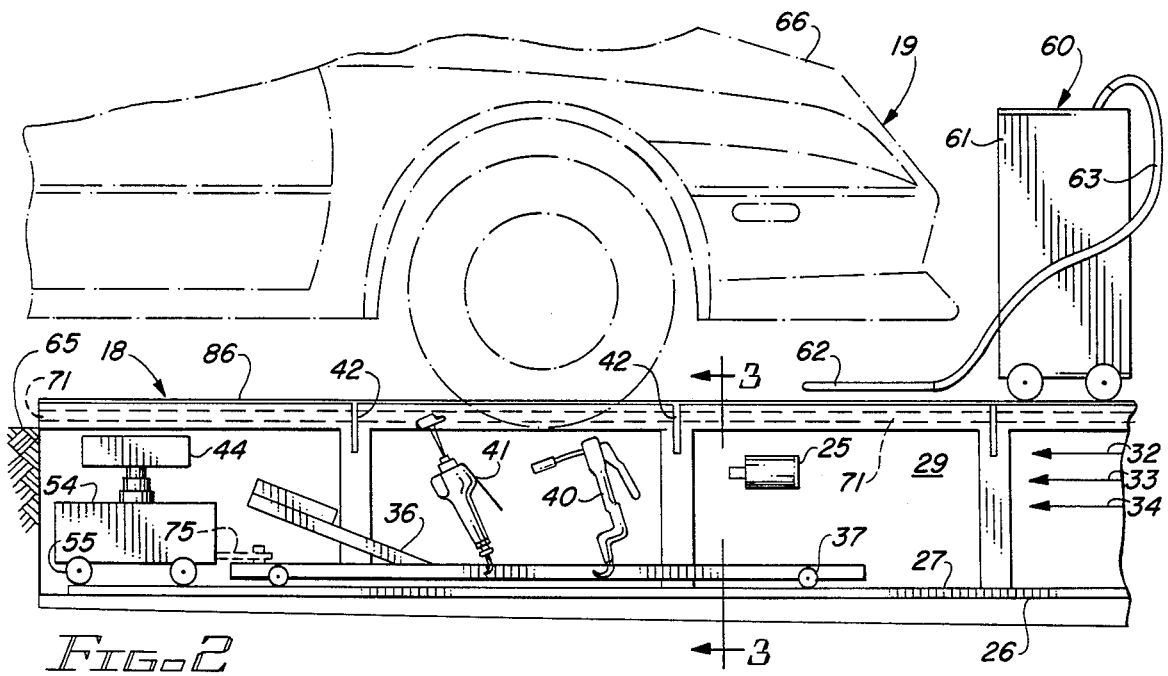
FIG. 2 is a side section elevation view illustrating a motor vehicle servicing system constructed in accordance with the principles of the invention.
Figure 3:
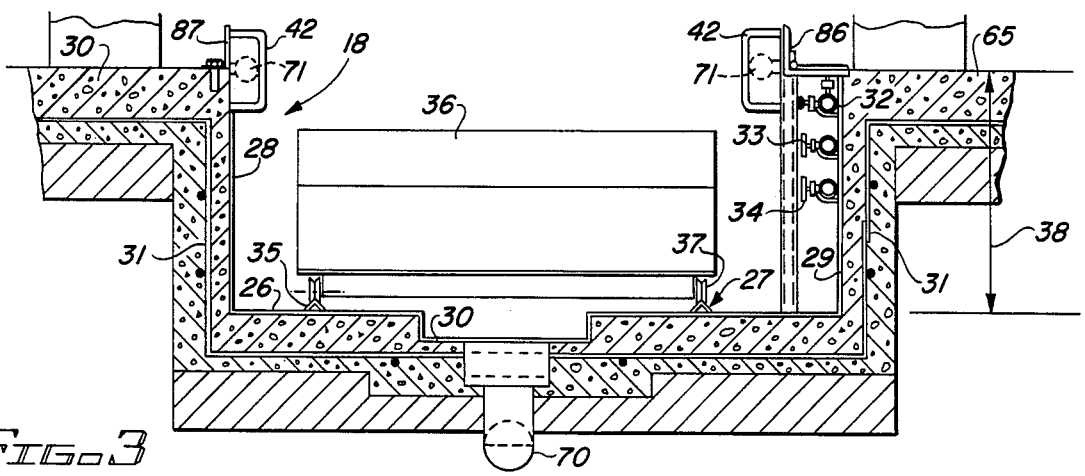
FIG. 3 is a front section view illustrating the motor vehicle service system of FIG. 2 and further construction details thereof.

As illustrated in FIGS. 2 and 3, trench 18 includes parallel spaced rails 27 on floor 6. Parallel spaced side walls 28, 29, along with lower floor 26 and U-shaped trough 30 comprises a steel liner which prevents oil from seeping into concrete. Rebar 31 strengthens concrete 30. Air 32, gear lubrication 33 and chassis lubrication 34 lines extend along side wall 29. Floor 26 is provided with a non-skid surface. Wheels 37 of creeper 36 roll along the sloped upper contact surfaces 35 of rails 27. Creeper 36 supports a mechanic in a reclining (lying or sitting) position beneath a vehicle 19 (FIG. 2) straddling trench 18. The depth 38 of trench 18 can vary, but is preferably fourteen to twenty-eight inches. Chassis lube tool 40 is connected to line 34, while gear lubrication tool 41 is connected to line 33. A mechanic on creeper 36 moves along rails 27 by grabbing handles 42 and pulling or pushing.

Figure 4:
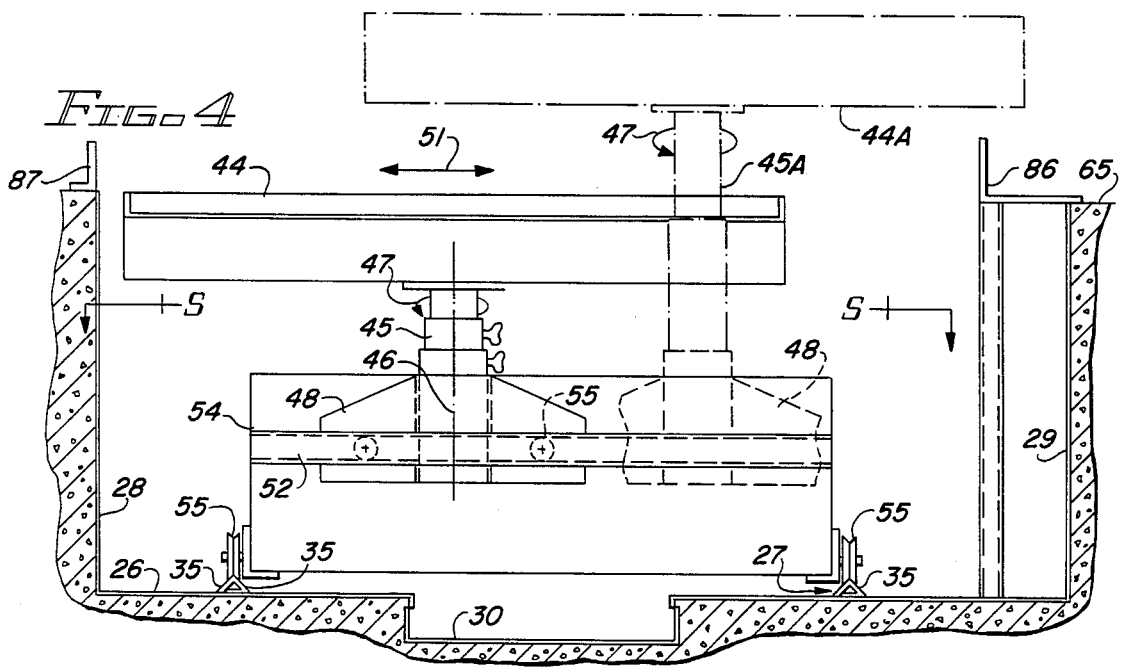
FIG. 4 is a side view illustrating the oil splash pan utilized in the system of FIG. 2.
Figure 5:
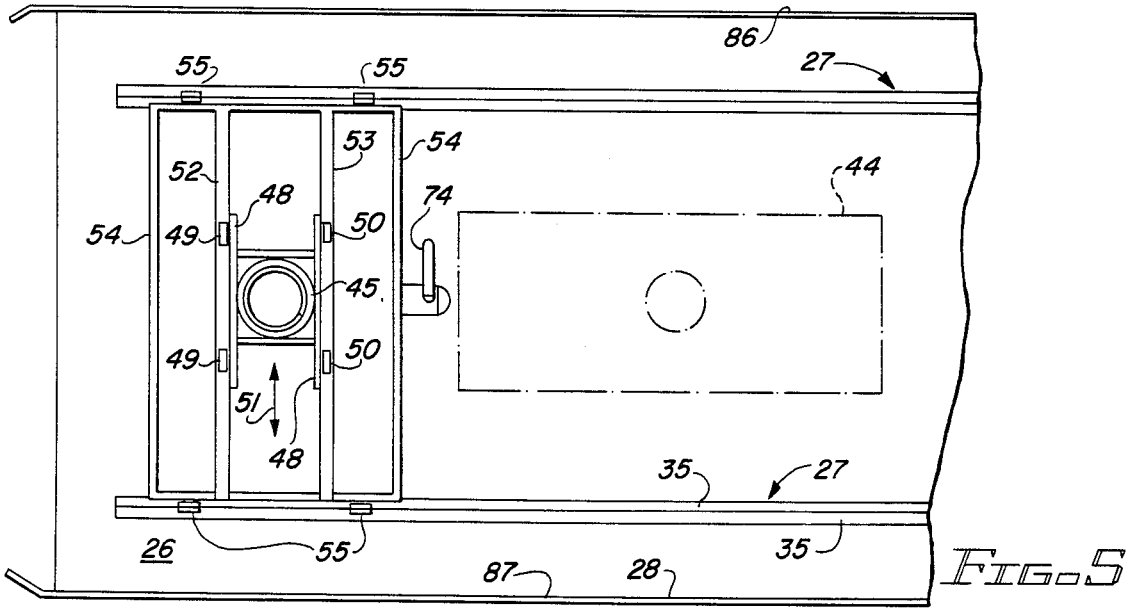
FIG. 5 is a top view illustrating the oil splash pan of FIG. 4.

In FIGS. 4, oil splash pan 44 is rotatably mounted on telescoping neck 45. Pan 44 can be rotated about a vertical axis 46 in the manner indicated by arrow 47. Neck 45 can be extended in the manner indicated by dashed lines 45A to adjust the elevation or vertical position of splash pan 44. Neck 45 is mounted on a base structure 48. Wheels 49, 50 rotatably mounted on base 48 permit base 48 and pan 44 to be manually laterally adjusted as indicated by arrows 51. Dashed lines 44A indicate a position to which pan 44 can be adjusted in FIG. 4. Wheels 49, 50 rotate along rails 52, 53, respectively, mounted in rectangular housing 54. Wheels 55 rotatably carried on housing 54 are shaped, contoured and dimensioned to roll along the upper contact surfaces 35 of rails 27.

In FIG. 2, oil removal means 60 includes upright cylindrical housing 61 adapted to suction oil through hollow wand 62 and hose 63 to a reservoir inside housing 61. Wand 62 is sized to be inserted through the oil dipstick tube of a vehicle down to the bottom of the crankcase or, in other words, to the bottom of the oil sump. In many cases nearly all of the oil and sludge in an engine oil sump can be removed utilizing wand 62. If wand 62 cannot remove all of the oil, a serviceperson on creeper 36 can remove the screw to the oil sump and drain out remaining oil into oil splash pan 44. Means 60 is fixed or portable and is utilized by a mechanic standing on ground floor 65 adjacent automobile 19. Wand 62 is inserted in the oil dipstick tube after the hood 66 of vehicle 19 is raised and the dipstick is removed from the oil dipstick tube.

Since the vehicle lubrication system of the invention removes oil from a vehicle through the dipstick tube with wand 62, a single serviceperson can, in most cases, operate the system. While the wand 62 and oil removal means 60 is being used to suction oil from the crankcase of an engine, the serviceperson can check other fluids and can lubricate the vehicle on creeper 36. The shallow trench 18 makes the accumulation of hazardous oil and gas vapors unlikely. Construction permits for trench 18 are, in comparison to the conventional pit system, much more readily approved because of safety and oil seepage control factors. This is particularly the case in geologically unstable areas, for example, in earthquake prone regions. The unitary liner 28, 26, 30, 29 preferably utilized in trench 18 is, because of the shallow depth of trench 18, relatively inexpensive to make and can readily be made structurally strong enough to resist minor stresses induced by minor earthquakes, loamy soils, etc. If desired, an oil collection sump can be attached to section 30 of trench 18. Sump 70 would preferably pump oil to an aboveground storage reservoir, but can also pump or drain oil to an underground reservoir.

Oil draining into pan 44 flows downwardly through hollow telescoping neck 45 into base 54. Valve 74 can be used to drain oil from base 54 into a reservoir; however, oil is preferably removed from base 54 with means 60. Wand 62, which has a relatively small opening through which oil is suctioned into hose 63, can be removed from hose 63 and oil suctioned directly into hose 63. A handrail 71 can be utilized with, or in place of, handles 42. Splash pan 44 and creeper 36 can, as indicated by dashed lines 75 in FIG. 2, be interconnected so they move simultaneously along rails 27.

Splash pan 44 can be fixedly attached to, mounted on, and carried by creeper 36.

As illustrated by dashed lines 44A in FIG. 4, splash pan 44 can be positioned over the L-shaped longitudinal edge 86 (or 87) intermediate the undercarriage of a vehicle and ground floor 65. The ability to position pan 44 over ground floor 65 facilitates drainage of oil from peripheral areas of the undercarriage of a vehicle.

While today's automobiles include a dipstick tube fitted on and extending from the crankcase, and include a dipstick in the dipstick tube, it would be possible to adapt a wand to function both as a dipstick and a wand. Such a wand-dipstick would take the place of a conventional dipstick and would include inscriptions on the housing of the hollow wand-dipstick to determine the depth or amount of oil in the crankcase when the wand-dipstick was pulled from the dipstick tube. However, when the hollow wand-dipstick was in the dipstick tube, a hose 63 (with wand 62 removed) could be attached to the wand-dipstick to draw oil from the crankcase through the hollow wand-dipstick, through hose 63, and into housing 61. Accordingly, if a conventional dipstick (or dipstick tube) were replaced with an inscribed wand, hose 63 of oil removal means 60 could draw oil through the wand-dipstick into housing 61.

If the dipstick tube were extended downwardly into the crankcase of a vehicle, it could, when the dipstick was removed and hose 63 was attached to the top of the dipstick tube, function like a wand and enable oil to be drawn upwardly through the dipstick tube, through hose 63, and into housing 61.

Having described my invention in such terms as to enable those skilled in the art to understand and practice it, and having identified the presently preferred embodiments thereof, I claim:

1. A vehicle lubrication system including
   (a) a building structure;
   (b) a motor vehicle servicing bay in said structure and a ground floor;
   (c) an elongate trench formed in said floor and having an opposed pair of parallel spaced side walls and a lower floor, said side walls being spaced a distance less than the spacing distance between corresponding wheels of the vehicle, whereby the vehicle can be positioned on said ground floor in straddling relation above the trench, said trench having a depth from said ground floor to said lower floor in the range of fourteen to twenty-eight inches;
   (d) a creeper for supporting a mechanic in a reclining position beneath the vehicle straddling said trench, said creeper including ground engaging wheels for moving said creeper over the lower floor;
   (e) an oil splash pan positioned in said trench for movement therealong beneath said vehicle;
   (f) oil removal means including
      (i) a wand positioned above said ground floor and shaped and dimensioned to be inserted by a mechanic standing on said ground floor through the oil dipstick tube of the vehicle into the oil sump of the vehicle, and
      (ii) suction means for drawing oil upwardly through said wand and out of the oil sump into an oil reservoir.
2. A vehicle lubrication system including
   (a) a building structure;
   (b) a motor vehicle servicing bay in said structure and including a ground floor;

(c) an elongate trench formed in said floor and having an opposed pair of parallel spaced vertical side walls and a lower floor, said side walls being spaced a distance less than the spacing distance between corresponding wheels of the vehicle, whereby the vehicle can be positioned on said ground floor in straddling relation above the trench;

(d) an entrance in said building structure for driving a customer's vehicle in a forward direction of travel over said trench into straddling relation therewith;

(e) an exit in said building structure for driving said vehicle in said forward direction of travel from straddling relation with said trench to a position away from said trench in a claim area, the customer picking up said vehicle in the claim area;

(f) an entryway in said building structure leading to a cashier area in said structure, the customer walking along said entryway to said cashier area in a direction of travel generally equivalent to said forward direction of travel of said vehicle over said trench;

(g) an exitway in said building structure leading from said cashier area to said claim area, the customer walking along said exitway to said claim area in a direction of travel generally equivalent to said forward direction of travel of said vehicle; and (h) a creeper on said lower floor of said trench for supporting a mechanic in a reclining position beneath the vehicle straddling the trench, said creeper including ground engaging wheels for moving said creeper over the floor of said trench.

3. The vehicle lubrication system of claim 2, including (a) a television camera positioned in said trench to view said trench and a mechanic servicing the undercarriage of the vehicle straddling said trench; and (b) a television screen in said structure operatively associated with said camera to display to a customer a mechanic working in said trench on the customer's vehicle.

4. The vehicle lubrication system of claim 3, including a window area intermediate said service bay and at least one of the group consisting of said entryway, cashier area, and exit walkway to permit a customer to view said service bay and his vehicle positioned over said trench.

5. A vehicle lubrication system including (a) a service bay having a ground floor;

(b) an elongate trench formed in said floor and having a lower floor and an opposed pair of parallel spaced vertical side walls, said side walls being spaced a distance less than the spacing distance between corresponding wheels of the vehicle, whereby the vehicle can be positioned on said ground floor in straddling relation above said trench, said trench having a depth from ground floor to said lower floor in the range of fourteen to twenty-eight inches;

(c) a creeper for supporting a mechanic in a reclining position beneath the vehicle straddling said trench, said creeper including ground engaging wheels for moving said creeper over the floor of said trench;

(d) an oil splash pan positioned in said trench for movement therealong beneath said vehicle; and, (e) oil removal means including
 (i) hollow wand means extending into the oil sump of the vehicle, and
 (ii) suction means attached to said wand means for drawing oil upwardly through said wand means out of said oil sump into an oil reservoir.

6. The vehicle lubrication system of claim 5 wherein the height and lateral position of said oil splash pan in said trench are adjustable.

7. The vehicle lubrication system of claim 6 wherein said creeper and oil splash pan are interconnected and simultaneously move over said lower floor.

8. The vehicle lubrication system of claim 6 wherein said creeper and oil splash pan are mounted on a pair of rails extending along said floor of said trench.

9. The vehicle lubrication system of claim 8 wherein said rails are shaped, contoured and dimensioned such that the upper contact surfaces of said rail are generally sloped to permit oil to flow downwardly under the flow of gravity toward said floor.

* * * * *